July 10, 1928.
B. DARROW
WHEEL MOUNTING
Filed Dec. 17, 1926
1,676,820
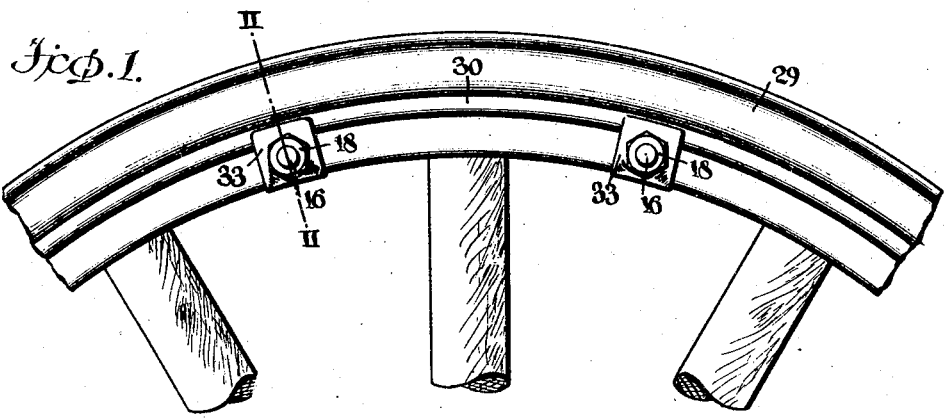
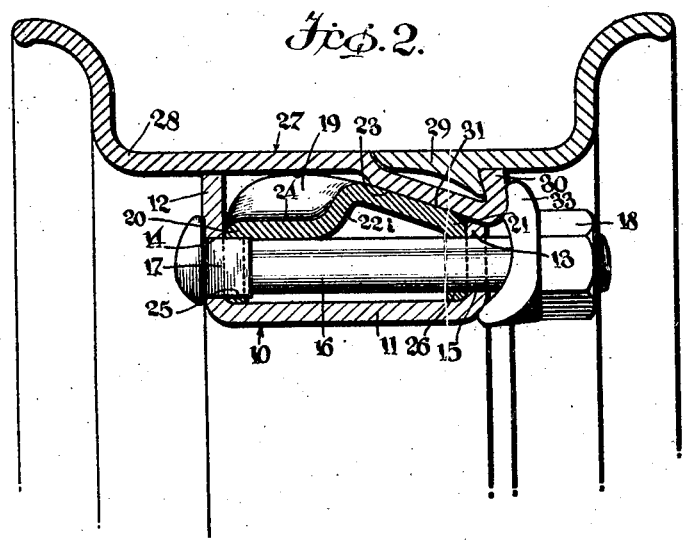
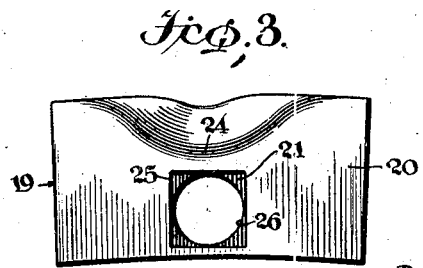
INVENTOR
Burgess Darrow,
BY
ATTORNEY Patented July 10, 1928.

1,676,820

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

WHEEL MOUNTING.

Application filed December 17, 1926. Serial No. 155,507.

My invention relates to vehicle wheel assemblies and it has particular reference to the type of wheel assemblies in which a tire-carrying rim is removably secured to a wheel felloe.

The object of my invention is to provide a wheel mounting of the type designated which is simple in construction, comprising few parts, which is adapted to be readily assembled and disassembled, and which is economical to manufacture.

Heretofore, a great many wheel assemblies have been proposed, many of which have been impractical for various reasons, such as multiplicity of parts, binding of the members, etc., and it was with a view to overcoming these various objections that my invention was conceived.

According to my invention I provide an improved form of wheel assembly embodying a plurality of devices, adapted to be carried by the rim-securing bolts, which constitute seating surfaces for the tire rim used in conjunction therewith.

A wheel assembly embodying a preferred form of my invention is illustrated in the accompanying drawings forming a part of this application, in which;

Fig. 1 is a fragmentary side elevational view, illustrating a wheel assembly embodying my invention;

Fig. 2 is a cross-sectional view taken substantially along the line II—II of Fig. 1 and illustrating the relation of the assembled parts one to another; and Fig. 3 is a side elevational view of one of the units embodying my invention.

A vehicle wheel may be provided with a felloe 10 having an annular base portion 11 formed with radially outwardly extending flanges 12 and 13. The flange 13 is of relatively less width than the flange 12. The flanges 12 and 13 are provided with aligned apertures 14 and 15 adapted to receive rim-securing bolts 16, each of which is formed with a squared shank portion 17 adjacent the heads thereof, the remainder of the shank being round and provided with screw threads for receiving nuts 18. The apertures 14 are rectangular in shape and are adapted to receive the squared portion 17 of the bolts 16.

A plurality of members 19 are provided for use in conjunction with the structure above described, which are preferably stamped from sheet metal, but may be formed in any desired manner. The members 19 comprise side portions 20 and 21 and an integral web portion 22, which is formed with a tapered face 23 adjacent one side and a depression 24 adjacent the middle portion of the opposite side 20. The side 20 is provided with a rectangular aperture 25 similar to the aperture 14 in flange 12 of the felloe 10, and an aligned circular aperture 26 is formed in the side 21. The device described above is of such width as to fit snugly between the flanges 12 and 13 of the felloe 10.

A tire carrying rim 27 is provided for use in conjunction with the parts above described and is composed of interfitting members 28 and 29, the member 28 having a circumferential inwardly extending tapered rib formed adjacent one edge thereof which provides a radially disposed abutment 30 and a beveled surface 31.

In mounting the wheel assembly above described the members 19 are so arranged in the channel formed by the flanges 12 and 13 of the felloe 10 that the apertures 14 and 25 are disposed in alignment with the apertures 15 and 26 respectively. The bolts 16 are then threaded through the apertures thus securing the members 19 in their proper relative positions between the flanges 12 and 13. The rim 27 which is adapted to support a tire, is then disposed about the felloe 10 with the beveled surface 31 resting on the tapered portions 23 of the members 19. Securing lugs 33 are placed on the projecting ends of the bolts 16 and the nuts 18 are tightened causing the tapered surface 23 and the cooperating beveled surface 31 to be wedged against each other. The opposite or inner side of the rim 27 either may or may not rest upon the edge of the flange 12 on the felloe 10.

It will readily be appreciated that my invention provides a very simple, durable and entirely practicable wheel mounting.

The members 19 provide adequate seating surface for the rim 27 and also, due to the bracing effect produced by forming the depressions 24, provide a construction adapted to withstand the stresses and strains occurring under actual working conditions.

Although I have specifically described but one form which my invention may assume, it will be apparent to those skilled in the art that the invention is not so limited, but that various modifications and changes may be made therein without departing from the spirit of the invention or from the scope of the appended claims.

What I claim is:

1. A wheel assembly comprising a felloe, a plurality of members formed with rim-seating surfaces disposed in the channel of the felloe said members having depressed portions opposite the rim-seating surfaces, a tire-carrying rim adapted to engage the seating surfaces, a plurality of bolts passing through apertures in the members to secure the members in the channel of the felloe and means cooperating with the bolts for securing the rim on the seating surfaces.

2. A device adapted to be disposed on a vehicle wheel felloe comprising parallel apertured side portions and a web portion connecting the side portions, one side of the web being tapered to provide a seat for a tire rim, the opposite side of the web having a depression formed in its surface.

3. A device adapted to be disposed on a vehicle wheel felloe comprising spaced apertured side walls and a connecting web, the web being formed to provide a tapered seat for a tire rim on one side and a depression adjacent and in alinement with the seat.

In witness whereof, I have hereunto signed my name.

BURGESS DARROW.